United States Patent [19]

Haerig et al.

[11] Patent Number: 4,632,512

[45] Date of Patent: Dec. 30, 1986

[54] VARIABLE LASER ATTENUATOR

[75] Inventors: Thomas Haerig, Kelkheim; Michael Plaot, Eschborn, both of Fed. Rep. of Germany

[73] Assignee: Mergenthaler Linotype GmbH, Eschborn, Fed. Rep. of Germany

[21] Appl. No.: 609,678

[22] Filed: May 14, 1984

[30] Foreign Application Priority Data

May 26, 1983 [DE] Fed. Rep. of Germany ....... 3319151

[51] Int. Cl.⁴ .............................................. G02B 5/20
[52] U.S. Cl. ................................................... 350/316
[58] Field of Search ................. 350/394, 314, 467, 316

[56] References Cited

U.S. PATENT DOCUMENTS

| | | | |
|---|---|---|---|
| 2,399,658 | 5/1946 | Banker | 350/407 |
| 2,403,731 | 4/1943 | MacNeille | 350/394 |
| 3,195,405 | 7/1965 | Clark et al. | 350/314 |
| 3,655,268 | 4/1972 | Reynolds | 350/394 |

*Primary Examiner*—Bruce Y. Arnold
*Attorney, Agent, or Firm*—Anibal Jose Cortina

[57] ABSTRACT

A variable laser beam attenuator for typographical composing and printing machines is disposed in the optical axis of a laser light source emitting polarized light of only one polarization. A rotatable filter wheel having a plurality of absorption filters therein for obtaining a coarse adjustment is followed by a fine adjustment means comprising two plane-parallel glass plates disposed in a mutually symmetrically inclined manner in a holder for infinitely variable attenuation without deflection of the laser light beam. The inclination of the glass plates is selected such that the angle of laser beam incidence is approximately equal to the Brewster Angle. The holder is adapted to pivot together with the glass plates as a unit, about the optical axis.

5 Claims, 2 Drawing Figures

VARIABLE LASER ATTENUATOR

BACKGROUND OF THE INVENTION

This invention relates to the field of a variable laser light attenuators for use in adjustable typographic composing and printing machines.

In order to illuminate a recording medium with a desired intensity in the field of typographical composition or printing and thus to achieve a desired blackness, e.g., in the case of a recording medium containing silver halides and thereby generally ensure sharp resolution of the illuminated indicia, it is desirable to attenuate the beam emitted by a light source. This requirement is of even greater importance, in particular if the exposure time of the medium to the light is variable. In order to attenuate the beam illuminating the recording medium when necessary, the prior art generally teaches employing a filter wheel for instance, one which is equipped with filters of different degrees of absorption adapted to be selectively rotated for a desired absorption level into the path of the beam. This, however, only permits rough adjustment should the number of filters available be unduly limited.

When using a laser light source, continuous attenuation of the beam illuminating the recording carrier proves to be somewhat more difficult than when flash lights or cathode ray tubes are used since the brightness of the latter can be varied by varying electric parameters.

Various means are known for attenuating laser light continuously, and if possible, without any other changes in the laser light beam. Such attenuators typically include, in particular, infrared polarizers comprising two trapezoidal prisms into which a body of $CaCO_3$ is cut at what is known as Brewster's Angle, i.e., the polarizing angle. The two prisms are mounted in a predetermined, fixed, mutual position by a holder. The holder is adapted to be moved in its entirety in the beam path of the laser to produce a variable attenuation. This polar, like other known attenuators, is designed to not be dependent, if at all possible, on the polarization of the light to be attenuated. The properties of the substance contained in this known polarizer were exploited for this purpose. However, the costs of manufacturing the optical parts of the attenuator are excessively costly since the attenuator must be produced from selected, naturally grown crystal.

Another known polarizer for effecting the variable attenuation of infrared light consists of six to ten plates disposed at Brewster's Angle and inclined such that the beam deflection caused by half of the plates is restored by the other half. The attenuation is due to the fact that, at the Brewster Angle, the light in the p-polarization is transmitted almost completely, whereas light in the s-polarization is reflected on each surface of the plates. The attenuation resulting due to this reflection is in accordance with Fresnel's Law. The comparatively large number of optical surfaces is disadvantageous in this technology, as considerable adjustment work is required, among other things, and also because there is a tendency for the light beam to undergo comparatively high deflection (beam steering).

To avoid further disadvantages of the aforementioned stack-of-plates polarizers constructed of plane plates, the prior art teaches to provide an attenuator with four wedge-shaped plates which are mutually inclined in pairs. To adjust the attenuation, the mutual inclination of the two plate pairs is changed; i.e., the plate pairs are rotated in opposite directions. This requires a relatively high mechanical cost outlay if other disadvantages (beam deflection) are to be avoided.

A feature all known laser light attenuators have in common is that the resultant outlay for use in commercial typographic composing and printing machines is too high.

SUMMARY OF THE INVENTION

It is thus one object of the instant invention to provide such an arrangement for attenuating laser light in typographic composing and printing machines while avoiding the disadvantages of known laser light attenuators which, although requiring a low mechanical and optical outlay, nonetheless fulfull high accuracy requirements in projecting and resolving the typographical indicia. In particular, only one simple mechanical movement should be necessary to adjust the attenuation. The tendency of the optical elements to go out of adjustment should be slight and, finally, the optical elements should cause only a slight beam deflection.

These and other objects, as will become readily apparent to those of ordinary skill in the art, are accomplished by the invention set forth herein.

In accordance with the invention, a laser light attenuator consists of two plane-parallel glass plates only which are disposed in a mutually symmetrically inclined relationship, inclined in the manner mentioned. Both glass plates are held together in a holder which can be rotated in its entirety in the optical axis, which is also the axis of rotation, with a simple adjustment movement to vary the attenuation while the mutual relationship of the plane-parallel glass plates is retained. Consequently, and because of the small number of plates, undesirable beam deflection is minimal.

The laser light attenuator according to the invention is designed such that it produces a relatively small variation of the attenuation as a function of the angle of rotation or pivoting of the glass plates over a continuous range and is used for continuous fine adjustments of the laser beam.

In order to produce greater changes in attenuation, this continuously attenuating unit is combined with a filter wheel having filters of different degrees of light transmission. This incrementally adjustable filter wheel attenuator is used for a coarse or rough laser beam adjustment and with the variable laser attenuator provides both a rough and fine adjustment of the attenuation of the laser beam intensity.

The use of a glass having an index of refraction from 1.7 to 1.8 for the plane-parallel glass plates has been found to be especially convenient since the glass plates can then be adjusted in inclination at approximately the Brewster Angle of about 60° to 180°−60°.

Using the preferred glass with an index of refraction of 1,799, an attenuation can be achieved which is one third less than the original intensity.

The attenuation factor can be enhanced on the one hand by providing the glass plates with vacuum-deposited layers while, on the other hand, the type of glass and the angle of inclination can be freely selected in a wide range, since the layer sequence and thickness can be matched to the angle and index of refraction of the glass plate. For an attenuation to one tenth of the original intensity, for example, one side of each of the two plates can be provided with a polarization-sensitive, uncomplicated, multiple vacuum-evaporated layer of titanium oxide and magnesium fluoride. The other respective side of the two plates can be left untreated or can be provided with a vacuum-deposited anti-reflection layer. In the event that the mechanical accuracy of the adjusting device for the pivotal holder indicates that even greater attenuation would be useful, the attenuation can be achieved by increasing the number of layers or by depositing a layer on both sides of the plate. This corresponds to a Brewster Angle of 60.93°. The plane-parallel glass plates of this type of glass can be adjusted to a Brewster Angle of 60°, to be in accordance with standard techniques with only a slight attenuation in the basic setting.

The basic setting is that setting in which the light is transmitted in the least attenuated possible form. In the ideal case in which the light with p-polarization impinges on the glass plate at Brewster's Angle, the beam is transmitted unattenuated. If, however, the glass plate is moved out of this basic setting by rotating the holder, the attenuation will increase until, at an angle of rotation of 90°, it reaches a maximum, according to Fresnel's Law, corresponding to the index of refraction of the glass.

The invention will now be explained as follows with reference to the drawings.

DETAILED DISCUSSION OF THE INVENTION

Figure 1:
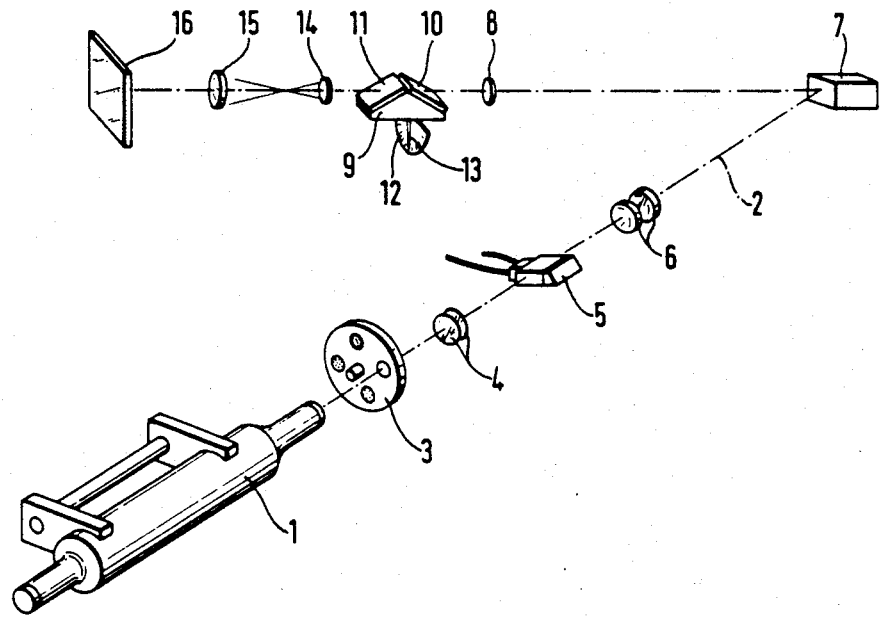
FIG. 1 is a schematic diagram of an arrangement showing the path of a simplified beam of a typographic composing machine comprising a filter wheel and a continuously variable laser light attenuator, and FIG. 2 schematically illustrates the continuously variable laser light attenuator of the invention shown in longitudinal cross-section.
Figure 2:
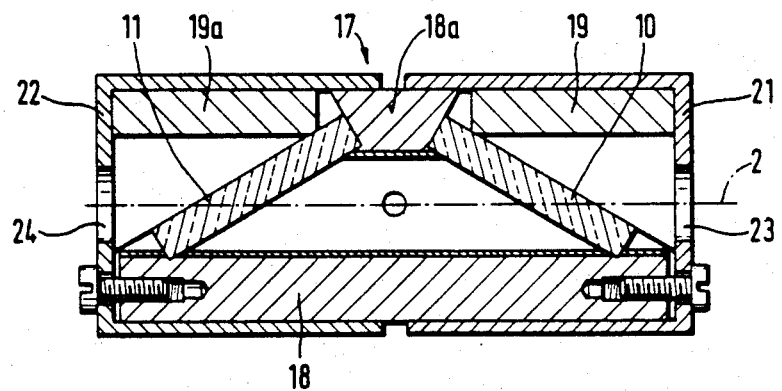

The illustration in FIG. 1 is reduced in scale, and that in FIG. 2 is enlarged.

In FIG. 1, 1 indicates a laser light source which a emits laser light beam polarized in one direction. A rotatable filter wheel 3, with four attenuation filters of differing absorption, for attenuating the intensity of the laser light beam, is positioned in the optical axis 2 (indicated by the dot-and-dash line) of the laser light beam. This is followed by a lens assembly 4 for condensing the laser light beam, a modulator 5 for modulating the beam with the displayed information and a lens assembly 6 for spreading the beam. After the modulated beam is diverted by a prismatic mirror 7, the beam passes through a collimator 8 to the infinitely-variable laser light attenuator 9.

FIG. 1 also depicts the mutually symmetrical inclined position of two plane-parallel glass plates 10 and 11 making up the laser light attenuator optically. A scale 12 and a pointer 13 are intended to indicate that the attenuation of the laser light beam is dependent on the rotation of the laser light attenuator 9, about the optical axis 2.

While the filter wheel 3 can achieve a rough adjustment of the intensity of the laser light beam, a continuous and infinitely fine adjustment of the intensity is effected by the variable laser light attenuator. The laser light, which has been adjusted to the desired intensity by means of the rough adjustment means 3 and fine adjustment means 9, is ultimately projected onto a recording carrier 16 by a decollimator 14 and an objective lens 15.

FIG. 2 reveals further details illustrating how the two mutually symmetrically inclined plane-parallel glass plates 10 and 11, which are set at the Brewster Angle with regard to the light beam, are mounted in a holder 17 and form, together with it, a unit adapted to be rotated or pivoted about optical axis 2. The holder consists, in particular, of a holding element 18 with a support bridge 18a against which two retention rings 19, 19a abut. The holder, together with the glass plates fixed therein, is held together by sleeves which are screwed together. The sleeves have openings 23, 24 on their end surfaces for transmission of the laser light beam.

The term laser light source which emits a polarized light of only one polarization is understood to mean a light source which emits light perferably of one polarization compared to other light, in an intensity ratio of 500:1 or more.

A helium neon laser from Messrs. Melles Griot of the trade name 05-LHP, commercially available with a polarization ratio of 500:1, for example, is suitable for the application in accordance with the invention.

We claim:

1. In a typographical composing and printing machine of the type wherein a laser light beam is employed to illuminate a recording medium, and said machine including a variable laser light attenuator for varying the intensity of the laser light beam, the improvement comprising, in combination in sequence, a filter wheel positioned in front of the laser light source, said filter wheel having a plurality of different filters, each filter capable of absorbing a predetermined amount of light different from that of the other filters, and said wheel being rotatable such that a selected filter can be placed in the path of light whereby rough attenuation of the light can be initially conducted, with said filter wheel being a first member making up a part of said laser light attenuator, lens means positioned for focusing said laser light beam onto modulator means provided for modulating the focused laser light beam, diverging lens means for spreading the laser light beam from said modulator means onto mirror means provided for diverting said laser light beam, collimating means arranged for collimating the diverted laser light beam from said mirror means, a second member making up part of said laser light attenuator for further attenuating the laser light beam from said collimating means, wherein said second member comprises holding means holding a pair of plane-parallel glass plates arranged in a mutually inclined relationship in said holding means in the path of the laser light beam, said inclination being such that the angle of incidence of the laser light beam on said plates is the Brewster Angle, and rotating means for rotating said holding means and plates assembly about the axis of the incident laser light beam for causing elective attenuation of the intensity of said laser light beam to a desired value.

2. A typographical composing and printing machine as in claim 1 wherein said glass plates have an index of refraction of about 1.7–1.8, and are inclined at about 60° about the angle of light incidence.

3. A typographical composing and printing machine as in claim 2 wherein the index of refraction is 1.799.

4. A typographical composing and printing machine as in claim 1 wherein said glass plates are coated on at least one side with a vacuum evaporated layer for the purpose of further enhancing fine adjustment attenuation.

5. A typographical composing and printing machine as in claim 1 wherein said holder is continuously rotatable for continuously performing said fine attenuation adjustment.

* * * * *